(12) United States Patent
Patarin et al.

(10) Patent No.: US 11,091,638 B2
(45) Date of Patent: Aug. 17, 2021

(54) SHOCK-ABSORBING NANOSTRUCTURED POLYMER ALLOY

(71) Applicants: RHEONOVA, Grenoble (FR); Centre National de la Recherche Scientifique (CNRS), Paris (FR)

(72) Inventors: Jérémy Patarin, Grenoble (FR); Guillaume Darsy, Grenoble (FR); Yahya Rharbi, Fontaine (FR)

(73) Assignees: RHEONOVA, Grenoble (FR); Centre National de la Recherche Scientifique (CNRS), Paris (FR)

( * ) Notice: Subject to any disclaimer, the term of this patent is extended or adjusted under 35 U.S.C. 154(b) by 60 days.

(21) Appl. No.: 16/469,271

(22) PCT Filed: Dec. 18, 2017

(86) PCT No.: PCT/FR2017/053645
§ 371 (c)(1),
(2) Date: Jun. 13, 2019

(87) PCT Pub. No.: WO2018/115677
PCT Pub. Date: Jun. 28, 2018

(65) Prior Publication Data
US 2020/0002536 A1    Jan. 2, 2020

(30) Foreign Application Priority Data
Dec. 21, 2016 (FR) ...................... 1663085

(51) Int. Cl.
*C08L 83/14* (2006.01)
*C08L 33/04* (2006.01)
*C08J 5/24* (2006.01)
*C08J 3/24* (2006.01)
*C08G 77/56* (2006.01)

(52) U.S. Cl.
CPC ............. *C08L 83/14* (2013.01); *C08J 3/243* (2013.01); *C08J 3/246* (2013.01); *C08J 5/24* (2013.01); *C08G 77/56* (2013.01); *C08J 2383/08* (2013.01); *C08J 2433/04* (2013.01); *C08L 2205/04* (2013.01); *C08L 2205/16* (2013.01); *C08L 2312/00* (2013.01)

(58) Field of Classification Search
CPC combination set(s) only.
See application file for complete search history.

(56) References Cited

U.S. PATENT DOCUMENTS

| | | |
|---|---|---|
| 2005/0037189 A1 | 2/2005 | Palmer et al. |
| 2012/0142239 A1 | 6/2012 | Budden et al. |
| 2014/0329975 A1 * | 11/2014 | Swanton ............ C08G 18/7621 525/453 |

FOREIGN PATENT DOCUMENTS

| | | |
|---|---|---|
| CN | 106147603 A | 11/2016 |
| WO | 03055339 A2 | 7/2003 |
| WO | WO 2015/191436 A1 * | 12/2015 |

OTHER PUBLICATIONS

Abstract for CN 105566914 (May 2016).*
Abstract for CN 106496450 (Mar. 2017).*
Machine translation of CN 106496450 (no date).*

* cited by examiner

Primary Examiner — Marc S Zimmer
(74) Attorney, Agent, or Firm — Banner & Witcoff, Ltd.

(57) ABSTRACT

The present invention relates to a shock-absorbing nanostructured polymer alloy, comprising:
- a (meth)acrylic polymer matrix comprising one or more (meth)acrylic polymer(s), said (meth)acrylic polymer matrix forming a (meth)acrylic network, and,
- at least one polyborodimethylsiloxane (PBDMS) distributed in the (meth)acrylic polymer matrix, the polyborodimethylsiloxane forming a network,
- the polyborodimethylsiloxane network and the (meth) acrylic network being intertwined.

The invention also relates to a chemical composition for the manufacture of such an alloy as well as a process for manufacturing a part made of such an alloy.

16 Claims, 3 Drawing Sheets

SHOCK-ABSORBING NANOSTRUCTURED POLYMER ALLOY

RELATED APPLICATION DATA

This application is a National Stage Application under 35 U.S.C. 371 of co-pending PCT application number PCT/FR2017/053645 designating the United States and filed Dec. 18, 2017; which claims the benefit of FR application number 1663085 and filed Dec. 21, 2016 each of which are hereby incorporated by reference in their entireties.

FIELD OF THE INVENTION

The present invention relates to a shock-absorbing nanostructured polymer alloy. Such a nanostructured alloy has many applications, particularly related to impact protection equipment.

STATE OF THE ART

Some materials behave differently from "conventional" materials when impacted. These materials are commonly referred to as "viscoelastic materials". These are materials whose viscosity and elasticity increase with increasing shear stress and loading frequency, especially during impact.

It is specified that the notion of "impact" or "shock" is to be interpreted in a broad sense. Shock absorption generally corresponds to the absorption of mechanical energy received by the material, whether the energy is applied directly to a point on the material (collision of an object with the material, for example), or whether the energy emanates from the external environment before being applied to the material (external vibrations transmitted to the material, for example). Hereinbelow, the term "shock-absorbing material" will be used for purposes of simplicity.

This ability of shock-absorbing materials to become more resistant as they are mechanically stressed offers many possibilities in the fields of composites, instrumental equipment, and personal protection and safety.

Protection devices made of shock-absorbing materials based on elastomeric foam or other compressible and resistant materials have been developed. However, they are generally associated with a rigid material whose role is to distribute energy over a large area in order to reduce its effects, making such devices uncomfortable and unsuitable for use, particularly when they are intended to be worn by an individual.

More recently, silicone-based shock-absorbing materials have been developed. However, they are not self-supporting and must therefore be contained in an envelope that maintains their structural, which creates difficulties in the design and use of these materials.

The document US 2005/037189 thus proposes a material formed of a foamed polymer matrix in which a silicone fluid is dispersed. But the presence of the foamed polymer matrix makes the material very inflexible and unsuitable for the manufacture of protection or safety devices for an individual, because such devices restrict the individual's movements. The foam sheet format limits the possibilities of incorporation into systems (composites, clothing, protection, etc.).

Furthermore, the foamed polymer matrix also makes it difficult or even impossible to manufacture fabrics with shock absorption properties.

In order to solve this flexibility problem, the document US 2012/142239 proposes a composition comprising an elastomer having a high modulus at 100% elongation, and a silicone. However, although more flexible, the material manufactured with such an elastomer-silicone composition lacks mechanical strength and offers insufficient shock absorption performance in the event of high mechanical stress.

DISCLOSURE OF THE INVENTION

The purpose of the invention is therefore to remedy the disadvantages of the prior art by proposing a material with good shock absorption properties.

The invention also aims to provide a compact shock-absorbing material that is versatile in its shaping possibilities and can be easily shaped.

Another purpose of the invention is to provide an item of equipment made of such a shock-absorbing material, to be used or worn by an individual, which does not hinder the individual's movements or interfere with the individual's activities.

To that end, according to a first aspect, the invention proposes a shock-absorbing nanostructured polymer alloy, comprising:
- a (meth)acrylic polymer matrix comprising one or more (meth)acrylic polymer(s), said (meth)acrylic polymer matrix forming a (meth)acrylic network, and,
- at least one polyborodimethylsiloxane (PBDMS) distributed in the (meth)acrylic polymer matrix, the polyborodimethylsiloxane forming a network,
- the polyborodimethylsiloxane network and the (meth)acrylic network being intertwined.

According to other aspects, the proposed nanostructured alloy has the following features, taken alone or in technically possible combinations:
- the (meth)acrylic polymer matrix forms a cross-linked (meth)acrylic network;
- the (meth)acrylic polymer is a poly(alkyl acrylate) or a poly(alkyl methacrylate) selected from: poly(methyl methacrylate), poly(ethyl methacrylate), poly(methyl acrylate), poly(ethyl acrylate), poly(butyl acrylate), poly(butyl methacrylate), and mixtures thereof.

The invention also proposes a chemical composition for the manufacture of a shock-absorbing nanostructured polymer alloy as described above, characterized in that it comprises:
- a (meth)acrylic monomer mixture comprising one or more (meth)acrylic monomer(s),
- at least one polyborodimethylsiloxane (PBDMS),
- at least one polymerization initiator, for initiating the polymerization of the (meth)acrylic monomer mixture to form a (meth)acrylic polymer matrix.

According to other aspects, the proposed chemical composition has the following different features, taken alone or in technically possible combinations:
- the chemical composition further comprises at least one cross-linking agent, intended to form chemical bonds between the polymer chains of the (meth)acrylic polymer matrix so that said (meth)acrylic polymer matrix forms a cross-linked (meth)acrylic network;
- the mass ratio of the mass of (meth)acrylic monomer to the sum of the masses of (meth)acrylic monomer and polyborodimethylsiloxane (PBDMS) is comprised between 30% and 70%;
- the mass ratio of the mass of polyborodimethylsiloxane (PBDMS) to the sum of the masses of (meth)acrylic monomer and polyborodimethylsiloxane (PBDMS) is comprised between 30% and 70%;

polyborodimethylsiloxane (PBDMS) and (meth)acrylic monomer are in a mass proportion of 30%/70%, respectively with respect to each other;

the content of the cross-linking agent is comprised between 1% and 10% by mass, based on the mass of the (meth)acrylic monomer matrix;

the polymerization initiator is a photoinitiator the content of which is comprised between 0.1% and 5% by mass, based on the mass of the (meth)acrylic monomer matrix.

The invention also proposes a process for manufacturing a shock-absorbing nanostructured alloy part from the preceding chemical composition, as well as a nanostructured alloy part obtained by this process. The said manufacturing process is characterized in that it comprises the following steps:

polymerizing the (meth)acrylic monomer mixture of the chemical composition to form a nanostructured alloy, shaping the nanostructured alloy to obtain a nanostructured alloy part.

According to other aspects, the proposed process for manufacturing a shock-absorbing nanostructured alloy part has the following features, taken alone or in technically possible combinations:

the shaping of the nanostructured alloy is carried out simultaneously with the polymerization or after the polymerization of the (meth)acrylic monomer mixture;

the process further comprises a step of cross-linking the (meth)acrylic polymer(s) obtained by polymerizing the (meth)acrylic monomer mixture.

The invention also proposes a process for manufacturing a composite part, from the preceding chemical composition, as well as a composite part obtained by this process, and a shock-absorbing item of equipment made from one or more nanostructured alloy part(s) and/or one or more composite part(s). The composite part manufacturing process is characterized in that it comprises the following steps:

impregnating a substrate with the chemical composition, polymerizing the (meth)acrylic monomer mixture of the chemical composition impregnating the substrate to form a composite material, shaping the composite material to obtain a composite part.

According to other aspects, the proposed composite part manufacturing process has the following different features, taken alone or in technically possible combinations:

the shaping of the composite material is carried out simultaneously with the impregnation of the substrate, or simultaneously with the polymerization of the (meth)acrylic monomer mixture, or after the polymerization of the (meth)acrylic monomer mixture;

the impregnation of the substrate is carried out by coating said substrate with the chemical composition;

the process further comprises a step of cross-linking the (meth)acrylic polymer(s) obtained by polymerizing the (meth)acrylic monomer mixture.

DESCRIPTION OF THE FIGURES

Other advantages and features of the invention will appear upon reading the following description given as an illustrative and non-limiting example, with reference to the attached Figures which represent.

DETAILED DESCRIPTION OF THE INVENTION

Nanostructured Polymer Alloy

A first object of the invention relates to a nanostructured polymer alloy with shock absorption properties.

The alloy comprises a (meth)acrylic polymer matrix comprising one or more (meth)acrylic polymers.

The alloy also comprises a polyborodimethylsiloxane (PBDMS), the latter being distributed in the (meth)acrylic polymer matrix.

"Polymer alloy" means a combination of at least two immiscible polymers.

The term "nanostructured" as used refers to a structured alloy of PBDMS in a (meth)acrylic polymer matrix, at a submicron scale (i.e., smaller than a micrometer), in the form of a (meth)acrylic network and a PBDMS network nested within each other. This aspect will be developed in more detail later in the description.

The term "monomer" as used refers to a molecule that can undergo polymerization. In particular, it will be understood that a "monomer" refers broadly to a monomer unit (or type of monomer), and not to a single monomer entity per se.

The term "(meth)acrylic monomer" refers to all types of acrylic and methacrylic monomers.

The term "(meth)acrylic polymer" refers to all types of acrylic and methacrylic polymers.

The term "polymerization" as used refers to the process of converting a monomer or a mixture of monomers into a polymer.

The term "cross-linking" as used refers to the process of converting a monomer or a mixture of monomers, a polymer or a mixture of polymers, into a cross-linked network.

The term "initiator" as used refers to a chemical species that, under the action of an external stimulus (for example light or heat) generates a reaction intermediate from a stable molecule which can start the polymerization of monomers into polymers.

Figure 1:
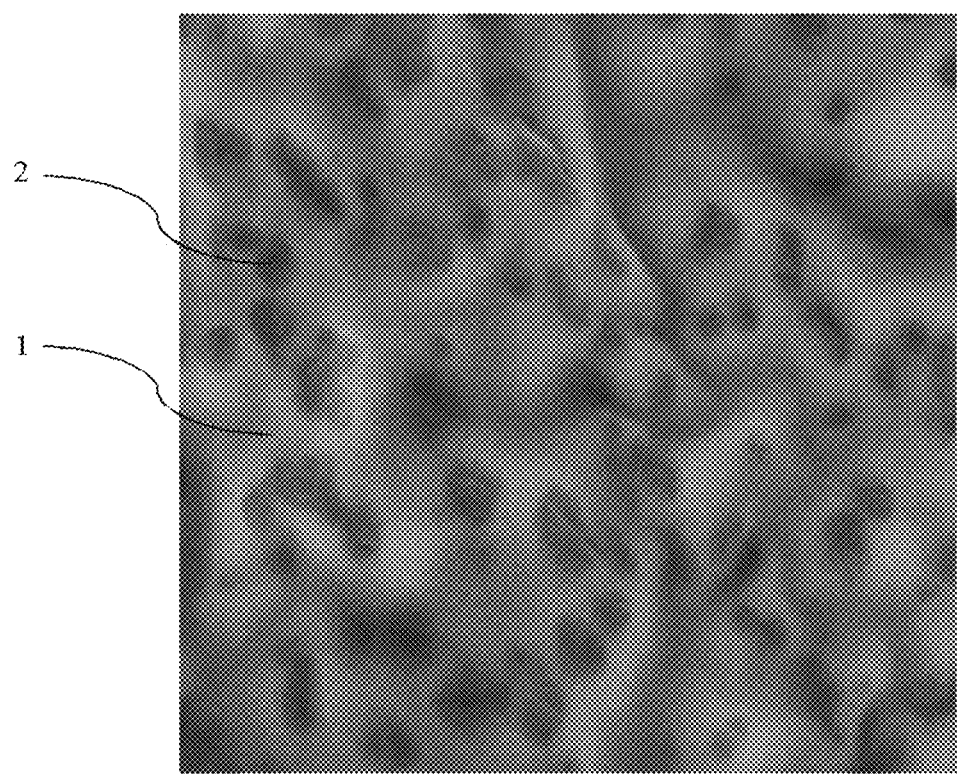
FIG. 1, a photograph of the structure of the nanostructured polymer alloy, obtained by scanning electron microscopy.

Concerning the nanostructured polymer alloy, it consists of a PBDMS (1) distributed in a (meth)acrylic polymer matrix (2), as can be seen in the scanning microscopy analysis in FIG. 1, on which the PBDMS (1) appears bright and the (meth)acrylic polymer matrix (2) appears dark.

PBDMS (1) acts as a functional polymer, in that it gives the alloy its damping properties by absorbing energy.

More specifically, PBDMS is a chemical compound comprising boron, in the form of boric acid, and a polydimethylsiloxane (PDMS), boric acid forming weak bonds with PDMS. Boric acid gives the functional polymer and the alloy their elastic properties, and the PDMS chain its damping properties by absorbing energy. The formation of weak bonds between boric acid and polydimethylsiloxane (PDMS) causes polyborodimethylsiloxane (PBDMS) to form its own network within the (meth)acrylic polymer matrix in which it is distributed.

The (meth)acrylic polymer matrix (2), in turn, acts as a structural polymer. It forms a continuous phase ensuring the cohesion and physical strength of the alloy.

The (meth)acrylic polymer matrix is in the form of a network, i.e. a macromolecular structure composed of intertwined polymer chains. Preferably, this (meth)acrylic network is cross-linked. In the latter case, the polymer chains in the network form a three-dimensional structure and are linked together by bonds, particularly by covalent bonds, formed by a cross-linking agent (also called a bridging agent).

When the (meth)acrylic matrix forms a cross-linked network, it has cross-linking nodes between which are arranged polymer chains resulting from the polymerization of one or more monomers. The cross-linked (meth)acrylic network is infusible.

Thus, the nanostructured alloy comprises a first polyborodimethylsiloxane (PBDMS) network (1), and a second, preferably cross-linked (meth)acrylic network formed by the (meth)acrylic polymer matrix (2), the first and second networks being closely intertwined, and intertwined with each other. In other words, the polymer chains of the (meth)acrylic network and the polymer chains of the PBDMS network intersect. This set of two networks is structured at the nanometric scale and constitutes a so-called "nanostructured" alloy.

To return to the (meth)acrylic polymer matrix, it comprises one or more (meth)acrylic polymer(s) obtained by polymerizing one or more (meth)acrylic monomer(s)

The step of polymerizing (meth)acrylic monomer(s) is preferably accompanied and/or followed by a step of cross-linking the (meth)acrylic polymer chains, in order to form a cross-linked (meth)acrylic network as described above. The cross-linked (meth)acrylic network consists of a single macro-(meth)acrylic polymer chain formed by a plurality of interconnected (meth)acrylic polymer chains.

The (meth)acrylic polymers constituting the (meth)acrylic polymer matrix are acrylic polymers and/or methacrylic polymers. More particularly, they may be (meth)acrylic homopolymers, (meth)acrylic copolymers, and mixtures thereof.

In the case of (meth)acrylic copolymers, these are notably random copolymers and block copolymers.

The (meth)acrylic copolymers can be structurally formed from one or more (meth)acrylic polymers, or a combination of one or more (meth)acrylic polymers and one or more non-(meth)acrylic polymers.

Preferably, the (meth)acrylic polymer is a poly(alkyl acrylate) or a poly(alkyl methacrylate) selected from: poly(methyl methacrylate), poly(ethyl methacrylate), poly(methyl acrylate), poly(ethyl acrylate), poly(butyl acrylate), poly(butyl methacrylate), and mixtures thereof.

The (meth)acrylic polymer is preferably selected according to whether or not a cross-linking step is performed after the polymerization step.

Preferably, a polymer with alkyl side chains of optimal length should be selected to allow excellent intertwining of the PBDMS and (meth)acrylic polymer matrix networks.

Concerning the polyborodimethylsiloxane (PBDMS), it is a so-called "functional polymer" in that it gives the alloy its elastic and energy absorption properties. It is distributed in the (meth)acrylic polymer matrix.

The structure of the nanostructured alloy gives it very good mechanical shock absorption properties, as well as a self-supporting nature in that its stability is ensured by its structure alone.

An advantage of the alloy is that good mechanical shock absorption and energy dissipation properties are obtained with a significantly reduced alloy thickness in comparison with state-of-the-art materials and in particular in comparison with expanded foam. This makes it possible, for example, to manufacture shock-absorbing equipment, such as personal safety and/or protection equipment, which is simple and practical to use, is thin, and does not hinder the movements of the individual who uses it (or wears it, in the case of clothing).

The Chemical Composition

The nanostructured polymer alloy is obtained from a chemical composition comprising a mixture of (meth)acrylic monomer(s), the latter itself comprising one or more (meth)acrylic monomer(s).

The chemical composition further comprises a polyborodimethylsiloxane (PBDMS), as well as at least one polymerization initiator to initiate polymerization of the (meth)acrylic monomer mixture to form the (meth)acrylic polymer matrix of the alloy.

The PBDMS is advantageously soluble in the (meth)acrylic monomer mixture, so as to form a solution of PBDMS in the (meth)acrylic monomer mixture. This makes is possible, after polymerization of the monomer mixture, and preferably after cross-linking of the formed (meth)acrylic polymers, to obtain a homogeneous distribution of the PBDMS network throughout the (meth)acrylic network of the alloy.

The (meth)acrylic monomer mixture comprises one or more (meth)acrylic monomer(s). The (meth)acrylic monomer comprises one or more methacrylic monomers and/or one or more acrylic monomers.

The (meth)acrylic monomer may be selected from: acrylic and methacrylic acids, salts of acrylic and methacrylic acids, esters formed from acrylic and methacrylic acids, or alkyl acrylates and alkyl methacrylates.

Preferably, the (meth)acrylic monomer is selected from: methyl methacrylate, ethyl methacrylate, methyl acrylate, ethyl acrylate, methacrylic acid, acrylic acid, butyl acrylate, n-octyl methacrylate, isobutyl methacrylate, n-butyl methacrylate and mixtures thereof.

Preferably, the (meth)acrylic monomer is an alkyl acrylate or an alkyl methacrylate selected from: methyl methacrylate, ethyl methacrylate, methyl acrylate, ethyl acrylate, butyl acrylate, butyl methacrylate, and mixtures thereof.

Furthermore, the mass ratio of the mass of (meth)acrylic monomer to the sum of the masses of (meth)acrylic monomer and polyborodimethylsiloxane (PBDMS) is preferably comprised between 30% and 70%.

The mass ratio of the mass of polyborodimethylsiloxane (PBDMS) to the sum of the masses of (meth)acrylic monomer and polyborodimethylsiloxane (PBDMS) is preferably comprised between 30% and 70%.

Most particularly preferably, polyborodimethylsiloxane (PBDMS) and (meth)acrylic monomer are in mass proportions of 30%/70% respectively with respect to each other.

The values of the mass proportions of PBDMS to (meth)acrylic monomer must be selected carefully. Indeed, a mass of PBDMS that is too high in comparison with that of the (meth)acrylic monomer creates a risk of PBDMS flowing out of the (meth)acrylic matrix, which destabilizes the alloy structure. Conversely, a mass of PBDMS that is too low in comparison with that of the (meth)acrylic monomer causes a significant decrease in the energy absorption properties of the alloy.

As for the polymerization initiator, it is selected according to the (meth)acrylic monomers to be polymerized.

Preferably, the polymerization initiator is a photoinitiator, in that it initiates the polymerization reaction when exposed to light, particularly ultraviolet radiation. The polymerization reaction is then a radical polymerization.

A polymerization initiator content of between 0.1% and 5% by mass, based on the mass of (meth)acrylic monomer, is preferred.

In addition, the chemical composition optionally comprises at least one cross-linking agent, also called a bridging agent. A cross-linking agent refers to a chemical species capable of forming bonds between several polymer chains. The cross-linking agent cross-links the chains of the (meth) acrylic polymer(s) so that the (meth)acrylic matrix forms a cross-linked (meth)acrylic network.

By definition, the cross-linking agent comprises reactive chemical functions similar to those of the chains of the (meth)acrylic polymer(s) it must cross-link.

Advantageously, the content of the cross-linking agent is comprised between 1% and 10% by mass, based on the mass of (meth)acrylic monomer.

The presence of the cross-linking agent contributes, together with the solubility of PBDMS in the (meth)acrylic monomer mixture to form a solution, to the production of a nanostructured polymer alloy in which the PBDMS network is distributed throughout the (meth)acrylic network, and in which the two preceding networks are well intertwined with each other. A nanostructured polymer alloy having even better shock absorption properties is thus obtained.

The chemical composition may optionally comprise fillers and/or additives.

Fillers improve the mechanical strength of the alloy. They may be mineral or organic. For example, fillers for abrasion resistance or flame retardants may be selected.

Additives, in turn, improve the visual appearance, handling, texture and durability of the alloy. For example, dyes, bactericides or fungicides, or surfactants may be selected.

The Process for Manufacturing a Nanostructured Alloy Part

Another object of the invention relates to a process for manufacturing one or more nanostructured polymer alloy part(s) with mechanical shock absorption properties, based on the chemical composition described above.

This process comprises the following steps:
  polymerizing the (meth)acrylic monomer mixture of the chemical composition to form a nanostructured polymer alloy,
  shaping the nanostructured polymer alloy to obtain a nanostructured alloy part.

The shaping of the nanostructured alloy can be carried out at the same time as, or after, the polymerization of the (meth)acrylic monomer mixture. It can be carried out by molding or by extrusion, for example, in particular by reactive extrusion.

The process for manufacturing a nanostructured alloy part optionally comprises a step of cross-linking the (meth) acrylic polymer(s) obtained by polymerizing the (meth) acrylic monomer mixture. The cross-linking step is performed after the polymerization of the (meth)acrylic monomer mixture. In practice, these two steps are often carried out almost simultaneously.

The Composite Part Manufacturing Process

Another object of the invention relates to a process for manufacturing one or more composite part(s) from the chemical composition described above and a substrate.

This process comprises the following steps:
  impregnating a substrate with the chemical composition,
  polymerizing the (meth)acrylic monomer mixture of the chemical composition impregnating the substrate to form a composite material,
  shaping the composite material to obtain a composite part.

It is specified that a "composite material" is a combination of at least two immiscible components. A synergistic effect is obtained by such a combination, so that a composite material has properties, in particular mechanical properties, that each of the components alone does not possess, or has to a lesser degree than the composite material. In the present case, the composite part comprises a first component consisting of the substrate, and a second component consisting of the nanostructured polymer alloy.

The substrate can be a fibrous substrate in that it consists of fibers, such as textile fibers for example.

The impregnation of the substrate by the chemical composition is preferably carried out by coating or by dipping.

The shaping of the composite material can be carried out at the same time as, or after, the polymerization of the (meth)acrylic monomer mixture.

The shaping of the composite material can, for example, be carried out by molding or by extrusion, in particular by reactive extrusion.

The composite part manufacturing process optionally comprises a step of cross-linking the (meth)acrylic polymer(s) obtained by polymerizing the (meth)acrylic monomer mixture. The cross-linking step is performed after the polymerization of the (meth)acrylic monomer mixture. In practice, these two steps are often carried out almost simultaneously.

The nanostructured alloy parts and the composite parts obtained by their respective manufacturing processes make it possible to produce shock-absorbing equipment.

Such equipment can be made from a single alloy or composite part, or by assembling several alloy and/or composite parts.

These items of equipment are preferably items of equipment for protecting an individual against impacts caused by elements of his environment. They are preferably intended to be worn or put on by an individual. They may alternatively cover an object or be part of such an object intended to come into contact with an individual.

Particular mention may be made of sports equipment such as technical clothing, bicycle saddles and horse saddles, racket handles and frames, for example, or safety equipment that ensures the physical integrity of an individual such as bullet-proof vests, or safety harnesses, for example.

Most particularly preferred are nanostructured alloy and/or composite parts for the manufacture of clothing intended to be worn by an individual, for various applications.

Example of the Manufacture of Fabrics Impregnated with a Polymerized Chemical Composition According to the Invention Preparation of the Chemical Composition PBDMS is dissolved in alkyl acrylate to obtain a mixture comprising 60% by mass PBDMS and 40% by mass alkyl acrylate.

2,2-Dimethoxy-2-phenylacetophenone (photoinitiator) is added to the mixture at 5% by mass based on the mass of alkyl acrylate.

The alkyl acrylate monomer and the 2,2-dimethoxy-2-phenylacetophenone were supplied by Sigma Aldrich. The PBDMS was provided by Silikony Polskie.

Preparation of Samples of Fabrics Impregnated with the Preceding Chemical Composition Fabric samples are prepared in the form of squares measuring 15 cm×15 cm. The fabrics are two types of synthetic fabrics: black nylon and white elastane/polyethylene (20/80 by mass) blend. This results in two samples of experimental fabrics to be impregnated with the preceding chemical composition, and two samples of control fabrics.

The two experimental fabric samples are fixed on a support by stretching them sufficiently so as to make their surface perfectly flat.

Each experimental fabric sample is then impregnated with the chemical composition by coating, in order to cover its entire surface homogeneously.

The impregnated fabric samples are then passed under UV light for 30 seconds.

The visual and rheological results of the two impregnated fabric samples are summarized in Table I below. The visual and rheological results of the two control fabric samples that were not impregnated are also shown, at the same peak frequency as the impregnated fabrics, by way of comparison with the latter.

TABLE I

| Sample | Appearance | Rheology | | | |
|---|---|---|---|---|---|
| | | Peak G' (kPa) | Peak G" (kPa) | Peak tan δ (—) | Peak frequency (Hz) |
| Non-impregnated nylon | Black fabric | 151.0 | 97.1 | 0.644 | 0.464 |
| Impregnated nylon | White polymer deposit on the surface of the nylon. | 18.3 | 17.8 | 0.976 | 0.464 |
| White, non-impregnated elastane/PE (20/80) fabric | White fabric | 113.7 | 57.9 | 0.509 | 0.464 |
| White impregnated elastane/PE (20/80) fabric | No visual trace of the composition. | 15.4 | 13.1 | 0.852 | 0.464 |

In Table I, G' corresponds to the elastic modulus (or storage modulus) of the impregnated fabric. The value of the elastic modulus makes it possible to characterize the intensity with which a material that is mechanically stressed, for example by an impact, stores and then releases the energy due to the stress.

G" corresponds to the viscous modulus (or loss modulus) of the impregnated fabric. The value of the viscous modulus makes it possible to characterize the intensity with which a material that is mechanically stressed, for example by impact, dissipates the energy due to the stress in the form of heat.

Tan δ corresponds to the ratio G"/G' between the elastic modulus and the viscous modulus, and is also called "phase shift". The value of the phase shift characterizes the predominant behavior of the material: it will tend towards 0 in the case of a solid, while it will tend towards infinity in the case of a non-Newtonian fluid.

The frequency f corresponds to the loading frequency of the material (during an impact for example).

The values of G', G", and tan δ, presented in Table I, are measured for a peak frequency f equal to 0.464 Hz.

Figure 2:
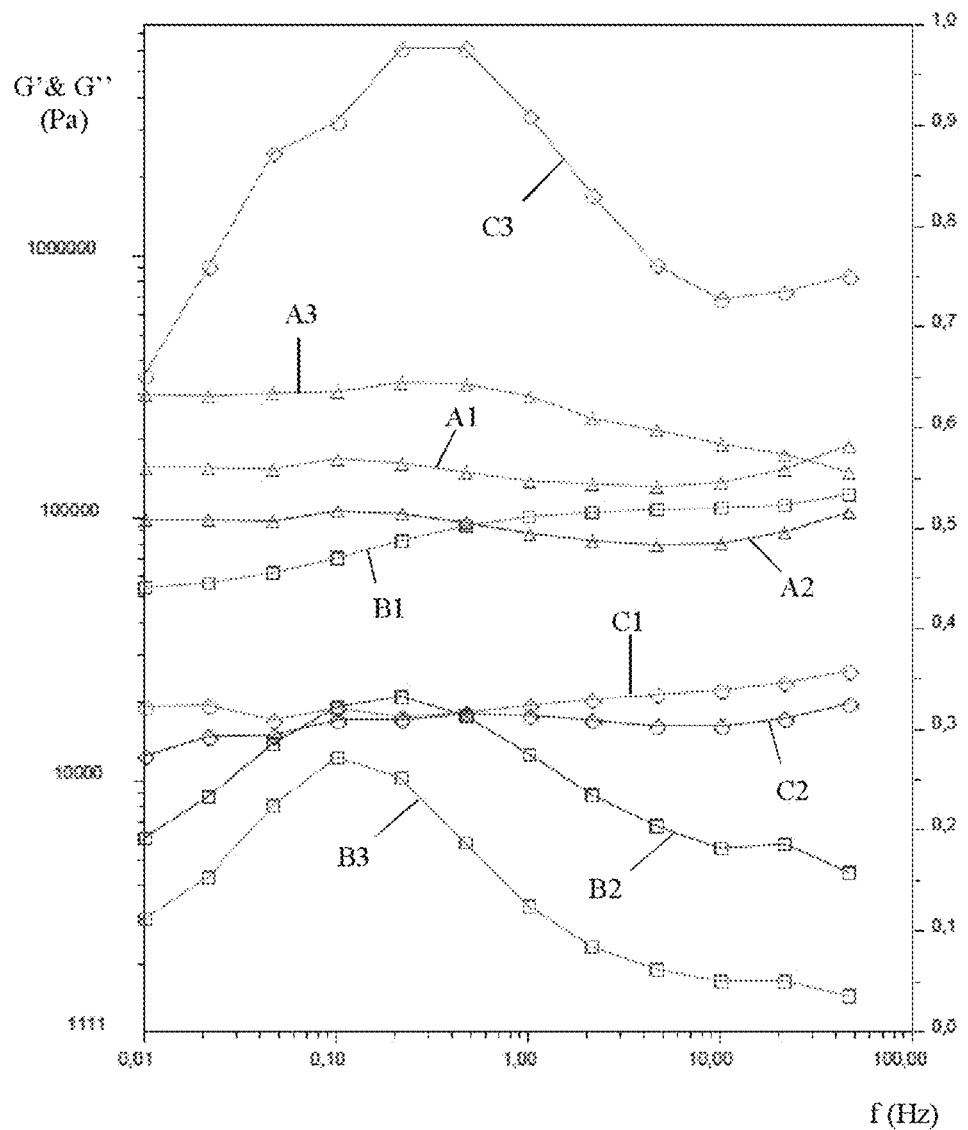
FIG. 2, a graph showing changes in the moduli G', G" and in tan δ as a function of the loading frequency, for a nylon fabric.

With reference to FIG. 2 and to Table I:
With the curves in FIG. 2 representing:
A1: G'—Non-impregnated nylon
A2: G"— Non-impregnated nylon
A3: Tan δ—Non-impregnated nylon
B1: G'—Composition
B2: G"—Composition
B3: Tan δ—Composition
C1: G'—Impregnated nylon
C2: G"—Impregnated nylon
C3: Tan δ—Impregnated nylon Curve C1 is lower than curves A1 and B1 over the entire frequency range shown. In particular, peak G' for the impregnated nylon (18.3 kPa) is lower than peak G' for the non-impregnated nylon (151 kPa).

Curve C2 is lower than curve A2 over the entire frequency range shown. In particular, peak G" for the impregnated nylon (17.8 kPa) is lower than peak G" for the non-impregnated nylon (97.1 kPa). Curve C2 is lower than curve B2 on the frequency interval [0.01; 0.10[U]0.50; 50] Hz, and higher than curve B2 on the frequency interval [0.10; 0.50].

Curve C3 is higher than curves A3 and B3 over the entire frequency range shown. In particular, peak tan δ for the impregnated nylon (0.976) is higher than peak tan δ for the non-impregnated nylon (0.644).

Figure 3:
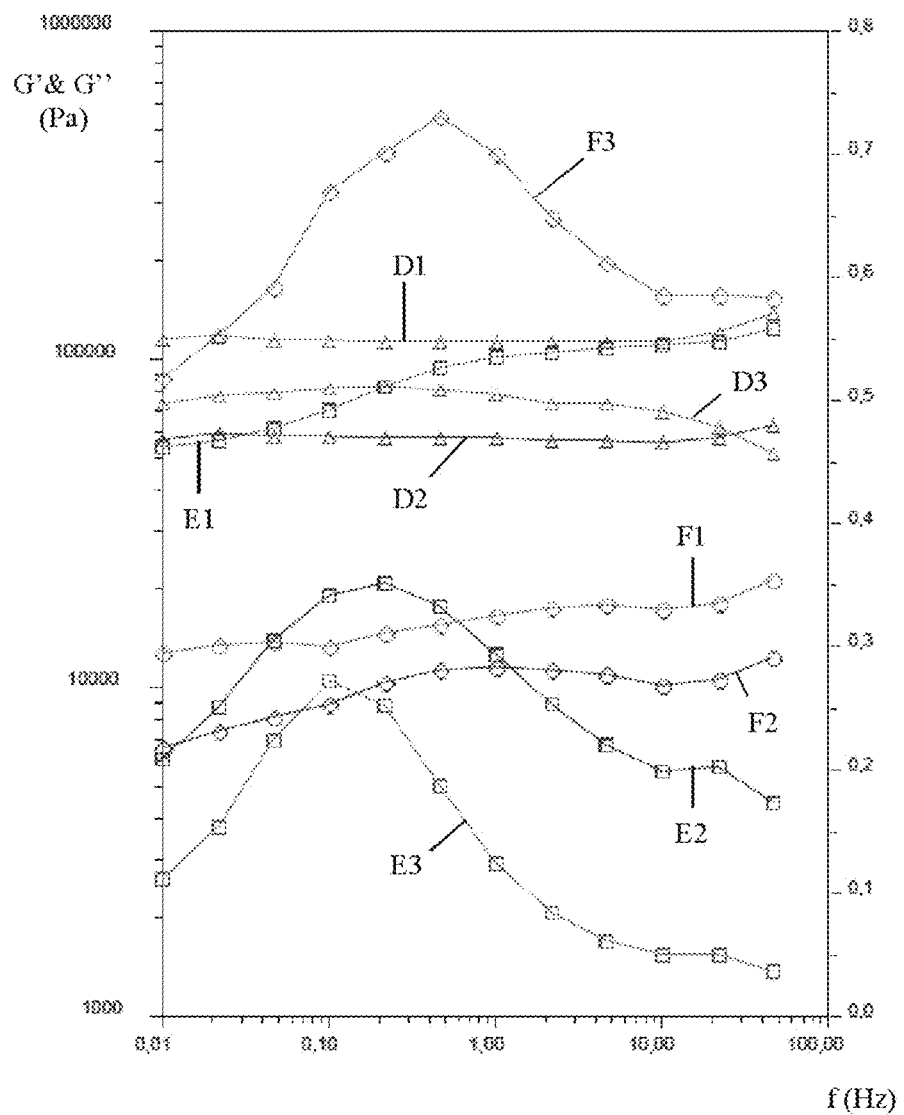
FIG. 3, a graph showing changes in the moduli G', G" and in tan δ as a function of the loading frequency, for an elastane/polyethylene fabric.

With reference to FIG. 3 and to Table I:
With the curves in FIG. 3 representing:
D1: G'—Non-impregnated elastane/PE
D2: G"—Non-impregnated elastane/PE
D3: Tan δ—Non-impregnated elastane/PE
E1: G'—Composition
E2: G"—Composition
E3: Tan δ—Composition
F1: G'—Impregnated elastane/PE
F2: G"—Impregnated elastane
F3: Tan δ—Impregnated elastane Curve F1 is lower than curves D1 and E1 over the entire frequency range shown. In particular, peak G' for the impregnated elastane/PE fabric (15.4 kPa) is lower than peak G' for the non-impregnated elastane/PE fabric (113.7 kPa).

Curve F2 is lower than curve D2 over the entire frequency range shown. In particular, peak G" for the impregnated elastane/PE fabric (13.1 kPa) is lower than peak G" for the non-impregnated elastane/PE fabric (57.9 kPa). Curve F2 is greater than curve E2 on the frequency interval [0.01; 0.012[U]1.2; 50] Hz, and less than curve E2 on the frequency interval [0.012; 1.2] Hz.

Curve F3 is higher than curves D3 and E3 over the entire frequency range shown. In particular, peak tan δ for the impregnated elastane/PE fabric (0.852) is higher than peak tan δ for the non-impregnated elastane/PE fabric (0.509).

In conclusion, the impregnation of nylon and elastane/PE fabrics results in a drop in elastic G' and viscous G" moduli in comparison with non-impregnated fabrics and with the chemical composition taken in isolation.

On the other hand, the impregnation of nylon and elastane/PE fabrics also leads to an increase in the tan δ phase shift seen in curves C3 and F3 as a pronounced peak, unlike curves A3 and D3 of non-impregnated fabrics. Tan δ thus reaches values close to 1, which indicates that the fabrics impregnated according to the invention have a high capacity to dissipate the energy received during mechanical stress, making them excellent composite parts for the manufacture of shock-absorbing protective and/or safety equipment.

REFERENCES

US 2005/037189
US 2012/142239

The invention claimed is:

1. A shock-absorbing nanostructured polymer alloy comprising:
    a (meth)acrylic polymer matrix comprising one or more (meth)acrylic polymer(s), said (meth)acrylic polymer matrix forming a cross-linked (meth)acrylic network, and,
    at least one polyborodimethylsiloxane (PBDMS) distributed in the (meth)acrylic polymer matrix, the polyborodimethylsiloxane forming a network,
    the polyborodimethylsiloxane network and the (meth)acrylic network being intertwined
    wherein the (meth)acrylic polymer is a poly(alkyl acrylate) or a poly(alkyl methacrylate) selected from: poly(methyl methacrylate), poly(ethyl methacrylate), poly(methyl acrylate), poly(ethyl acrylate), poly(butyl acrylate), poly(butyl methacrylate), and mixtures thereof.

2. A chemical composition for the manufacture of the shock-absorbing nanostructured polymer alloy of claim 1, said chemical composition comprising:
    a (meth)acrylic monomer mixture comprising one or more (meth)acrylic monomer(s),
    at least one polyborodimethylsiloxane (PBDMS),
    at least one polymerization initiator, for initiating the polymerization of the (meth)acrylic monomer mixture to form a (meth)acrylic polymer matrix, and
    at least one cross-linking agent for forming chemical bonds between the polymer chains of the (meth)acrylic polymer matrix so that said (meth)acrylic polymer matrix forms a cross-linked (meth)acrylic network,
    wherein the content of the cross-linking agent is comprised between 1% and 10% by mass based on the weight of the (meth)acrylic monomer matrix.

3. The chemical composition of claim 2, wherein the mass ratio of the mass of (meth)acrylic monomer to the sum of the masses of (meth)acrylic monomer and polyborodimethylsiloxane (PBDMS) is comprised between 30% and 70%.

4. The chemical composition of claim 2, wherein the mass ratio of the mass of polyborodimethylsiloxane (PBDMS) to the sum of the masses of (meth)acrylic monomer and polyborodimethylsiloxane (PBDMS) is comprised between 30% and 70%.

5. The chemical composition of claim 2, wherein polyborodimethylsiloxane (PBDMS) and (meth)acrylic monomer are in a mass proportion of 30%/70% respectively with respect to each other.

6. The chemical composition of claim 2, wherein the polymerization initiator is a photoinitiator the content of which is comprised between 0.1% and 5% by mass, based on the weight of the (meth)acrylic monomer matrix.

7. A process for manufacturing a shock-absorbing nanostructured alloy part from the chemical composition of claim 2, comprising the following steps:
    polymerizing the (meth)acrylic monomer mixture of the chemical composition to form a (meth)acrylic polymer matrix,
    cross-linking the (meth)acrylic polymer matrix to form a nanostructured alloy, and
    shaping the nanostructured alloy to obtain a nanostructured alloy part.

8. The manufacturing process of claim 7, wherein the shaping of the nanostructured alloy is carried out at the same time as, or after, the polymerization of the (meth)acrylic monomer mixture.

9. A nanostructured alloy part obtained by the manufacturing process of claim 7, wherein the nanostructured alloy part comprises
    a (meth)acrylic polymer matrix comprising one or more (meth)acrylic polymer(s), said (meth)acrylic polymer matrix forming a cross-linked (meth)acrylic network, and,
    at least one polyborodimethylsiloxane (PBDMS) distributed in the (meth)acrylic polymer matrix, the polyborodimethylsiloxane forming a network,
    the polyborodimethylsiloxane network and the (meth)acrylic network being intertwined,
    wherein the (meth)acrylic polymer is a poly(alkyl acrylate) or a poly(alkyl methacrylate) selected from: poly(methyl methacrylate), poly(ethyl methacrylate), poly(methyl acrylate), poly(ethyl acrylate), poly(butyl acrylate), poly(butyl methacrylate), and mixtures thereof.

10. A process for manufacturing a composite part, from a chemical composition comprising:
    a (meth)acrylic monomer mixture comprising one or more (meth)acrylic monomer(s),
    at least one polyborodimethylsiloxane (PBDMS), and
    at least one polymerization initiator, for initiating the polymerization of the (meth)acrylic monomer mixture to form a (meth)acrylic polymer matrix,
    the process comprising the following steps:
    impregnating a substrate with the chemical composition,
    polymerizing the (meth)acrylic monomer mixture of the chemical composition impregnating the substrate to form a composite material, and
    shaping the composite material to obtain a composite part.

11. The manufacturing process of claim 10, wherein the shaping of the composite material is carried out simultaneously with the impregnation of the substrate, or simultaneously with the polymerization of the (meth)acrylic monomer mixture, or after the polymerization of the (meth)acrylic monomer mixture.

12. The manufacturing process of claim 10, wherein the impregnation of the substrate is carried out by coating said substrate with the chemical composition.

13. The manufacturing process of claim 10, further comprising a step of cross-linking the (meth)acrylic polymer(s) obtained by polymerizing the (meth)acrylic monomer mixture.

14. A composite part obtained by a manufacturing process comprising:
    providing a chemical composition comprising:
        a (meth)acrylic monomer mixture comprising one or more (meth)acrylic monomer(s), at least one polyborodimethylsiloxane (PBDMS), and at least one polymerization initiator, for initiating the polymerization of the (meth)acrylic monomer mixture to form a (meth)acrylic polymer matrix, impregnating a substrate with the chemical composition, polymerizing the (meth)acrylic monomer mixture of the chemical composition impregnating the substrate to form a composite material, and shaping the composite material to obtain a composite part.

15. A shock-absorbing equipment including at least one nanostructured alloy part comprising a (meth)acrylic polymer matrix comprising one or more (meth)acrylic polymer(s), said (meth)acrylic polymer matrix forming a cross-linked (meth)acrylic network, and, at least one polyborodimethylsiloxane (PBDMS) distributed in the (meth)acrylic polymer matrix, the polyborodimethylsiloxane forming a network, the polyborodimethylsiloxane network and the (meth)acrylic network being intertwined, wherein the (meth)acrylic polymer is a poly(alkyl acrylate) or a poly(alkyl methacrylate) selected from: poly(methyl methacrylate), poly(ethyl methacrylate), poly(methyl acrylate), poly(ethyl acrylate), poly(butyl acrylate), poly(butyl methacrylate), and mixtures thereof.

16. A shock-absorbing equipment including at least one composite part comprising a substrate, and a nanostructured alloy impregnating the substrate, the nanostructured alloy comprising a (meth)acrylic polymer matrix comprising one or more (meth)acrylic polymer(s), said (meth)acrylic polymer matrix forming a cross-linked (meth)acrylic network, and, at least one polyborodimethylsiloxane (PBDMS) distributed in the (meth)acrylic polymer matrix, the polyborodimethylsiloxane forming a network, the polyborodimethylsiloxane network and the (meth)acrylic network being intertwined, wherein the (meth)acrylic polymer is a poly(alkyl acrylate) or a poly(alkyl methacrylate) selected from: poly(methyl methacrylate), poly(ethyl methacrylate), poly(methyl acrylate), poly(ethyl acrylate), poly(butyl acrylate), poly(butyl methacrylate), and mixtures thereof.

\* \* \* \* \*